(12) United States Patent
Nakamura et al.

(10) Patent No.: US 6,261,715 B1
(45) Date of Patent: *Jul. 17, 2001

(54) BATTERY ATTACHING MECHANISM FOR PORTABLE COMPUTERS

(75) Inventors: Fusanobu Nakamura, Kanagawa-ken; Takehiko Noguchi, Yokohama; Katsutoshi Katoh, Tokyo, all of (JP)

(73) Assignee: International Business Machines Corp., Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/041,492

(22) Filed: Mar. 12, 1998

(51) Int. Cl.⁷ .................................................. H01M 2/10
(52) U.S. Cl. .............................. 429/100; 429/97; 429/99
(58) Field of Search .............................. 429/100, 99, 96, 429/97; H01M 2/10

(56) References Cited

U.S. PATENT DOCUMENTS

| 4,853,302 | * | 8/1989 | Yamanaka et al. | ............... 429/100 X |
| 4,880,712 | * | 11/1989 | Gordecki | ............... 429/100 X |
| 6,051,334 | * | 4/2000 | Tsurumaru et al. | ............... 429/97 |

FOREIGN PATENT DOCUMENTS 816278   6/1994   (JP) ................................. G06F/1/16

* cited by examiner

*Primary Examiner*—John S. Maples
(74) *Attorney, Agent, or Firm*—Douglas W. Cameron; Anne Vachon Dougherty

(57) ABSTRACT

A battery attaching mechanism for a portable computer by which an accommodated battery can be safely stored and secured, yet easily removed. The battery attaching mechanism comprises a recessed battery compartment provided on the body of the portable electronic apparatus, a latching member for latching the battery pack, said latching member being provided on a side wall of said battery compartment and having an outer latching member surface, a locking member for inhibiting said latching member from being released by contact with said outer latching member surface of said latching member, a connector for receiving a connector of said battery pack, and a removal assisting section for, in the vicinity of said connector, pushing said accommodated battery pack away from said connector.

14 Claims, 8 Drawing Sheets

BATTERY ATTACHING MECHANISM FOR PORTABLE COMPUTERS

FIELD OF THE INVENTION

The present invention relates to a battery attaching mechanism for portable computers, and in particular to a battery attaching mechanism, for portable computers, in which a battery compartment is recessed in the wall face of a computer. More specifically, the present invention pertains to a battery attaching mechanism, for portable computers, in which a stored battery can be securely fixed, and can also be easily removed by performing a simple operation.

BACKGROUND OF THE INVENTION

As a consequence of recent technical developments, various types of personal computers (PC), such as desktop, tower and notebook types, are being manufactured and sold. The notebook PCs that are produced are compact and light, and are designed while taking into consideration their use in a mobile environment, i.e., their portability and suitability for outdoor use.

FIG. 10 is a specific diagram illustrating a notebook PC. A notebook PC 1 has a so-called "clam shell structure" constituted by a PC main body 2, which incorporates a system board and external storage devices (e.g., a hard disk drive, HDD, and a floppy disk drive, FDD), and a lid 3, which is pivotally hinged at the rear edge of the main body 2. A keyboard unit 13 is mounted on the upper face of the main body 2, and a liquid crystal display (LCD) unit 18 is provided inside the lid 3. When the PC 1 is not used or is to be carried, the lid 3 is closed so that the keyboard unit 13 and the LCD unit 18 are protected by a strong case.

One of the features of a notebook PC is "battery operation," for which power is supplied by an incorporated battery. This feature is provided so that the PC can be used outdoors, for business trips, or on other occasions when an AC power source is not readily available. The incorporated battery is generally a "battery pack," which is a package containing a plurality of battery cells. For such battery packs, rechargeable battery cells, such as Li-Ion cells or NiMH cells, are employed.

A battery pack 15 is usually flat, and is placed in a special storage space within the main body 2 of the notebook PC 1. For a PC model, such as the "IBM ThinkPad 760" ("ThinkPad" is a trademark of IBM Corp.), a notebook PC sold by IBM Japan, Ltd., the keyboard unit 13 can be opened and closed relative to the main body 2 of the PC 1 to access a battery 15 held in a battery compartment 14 (see FIG. 11).

For a PC model such as the "IBM ThinkPad 560," also sold by IBM Japan, Ltd., that has a keyboard unit 13 that can not be opened, a shallow battery compartment 16 is recessed in the bottom of a main body 2 of a PC 1. A battery pack 17 can be inserted through an opening formed in the face of the front wall of the main body 2 (see FIG. 12), and by manipulating a slide knob 6, which is provided at the periphery of the battery compartment 16, the battery pack 17 can be securely locked in place by a holding mechanism (not shown). When the slide knob 6 is slid in the direction opposite to the locking direction, the battery pack 17 is released from the locked state to permit its removal and replacement. In this case, portions of the side walls of the battery pack 17 are exposed, even when the pack 17 is inserted into the main body 2, and constitute parts of the main body 2 of the notebook PC 1.

Packaged in each of the battery packs 15 and 17 for the notebook PCs 1 are ten battery cells, sufficient to provide the several hours of operation. In other words, the weight of each of the battery packs 15 and 17 is several tenths that of a corresponding notebook PC 1, and the energy density per volume/capacity is very high. The battery packs 15 and 17 must therefore be carefully handled. When a battery pack 15 or 17 is dropped, not only can its cover be damaged and a user injured, but also a short-circuit between terminals will occur as the result of entry of a foreign metal substance, resulting in ignition and explosion. When a notebook PC is designed, therefore, one of the important design considerations is how to securely fix the battery pack 15 or 17 in the battery compartment.

For the above described notebook PC that has a keyboard unit 13 that can be opened (e.g., the "IBM ThinkPad 760"), the problem concerning the dropping of the battery pack 15 can be easily resolved by securely fixing the keyboard unit 13 to the main body 2. For the model wherein the battery compartment 16 is recessed in the bottom of the main body 2 of the notebook PC 1, this problem is not easily resolved. This is because: the opening of the battery compartment 16 is directed downward, i.e., in the direction in which the battery pack 17 may fall; the slide knob 6 for unlocking the battery pack 17 is exposed on the bottom surface; and the portions of the side walls of the battery pack 17 constitute parts of the main body 2 of the notebook PC 1 and are easily affected by an impact.

When, for example, a user is carrying the notebook PC 1, and he or she inadvertently displaces the slide knob with one of the fingers holding the main body 2 of the PC 1, the battery pack 17 may fall off. Since the slide knob 6 slides along the bottom face of the main body 2, such an accident can easily occur.

Further, when the notebook PC is being removed from a bag, the slide knob 6 can be displaced by catching on one of the objects surrounding it.

In addition, if the notebook PC is being used but the user forgot to lock in the battery pack 17, the battery pack 17 may fall when the main body 2 is lifted.

It would be relatively easy for one having ordinary skill in the art to envision a double locking system wherein a locking mechanism, for inhibiting the movement of the slide knob 6, is separately attached in order to ensure that the battery pack 17 is securely held. The structure of the locking mechanism in this case could provide for a bar (not shown) to be inserted in the direction in which the slide knob 6 moves. Since a dual operation, such as the release/holding of the battery pack 17 and the unlocking/locking of the slide knob 6, would be required to replace the battery pack 17, for a user, employing this structure would not be easy.

Were a user to forget that attachment/detachment was inhibited by the holding mechanism and the locking mechanism, and try to force the battery pack into the battery compartment 16, peripheral components around the battery compartment 16 would be damaged.

It is therefore one object of the present invention to provide a superior battery attaching mechanism, for portable computers, in which a battery compartment is recessed in the face of a wall of a computer.

It is another object of the present invention to provide a battery attaching mechanism for portable computers with which a battery can be safely stored and secured, and yet can be easily removed by performing a simple operation.

It is an additional object of the present invention to provide a battery attaching mechanism, for portable computers, with which, even when a battery holding state or a battery locked state exists in the computer, a battery pack can be accommodated without causing damage to a holding mechanism and a locking mechanism.

SUMMARY OF THE PRESENT INVENTION

To achieve the above objects, according to a first aspect of the present invention, a battery attaching mechanism, for a portable electronic apparatus into which a battery pack can be accommodated, comprises: (a) a battery compartment for accommodating a battery pack, the compartment being a recessed portion provided on the body of the portable electronic apparatus; (b) a latching member for latching the accommodated battery pack, the latching member being provided on a side wall of the battery compartment; and (c) a locking member for inhibiting the latching member from being released by being pushed along the depth of the battery compartment.

According to a second aspect of the present invention, a battery attaching mechanism, for a portable electronic apparatus into which a battery pack can be accommodated, comprises: (a) a battery compartment for accommodating a battery pack, the compartment being a recessed portion provided on the body of the portable electronic apparatus; (b) a latching member for latching the accommodated battery pack, the latching member being provided on a side wall of the battery compartment; (c) a locking member for inhibiting the latching member from being released by being pushed along the depth of the battery compartment; (d) an apparatus connector for receiving a connector of the battery pack in the direction of the depth of the battery compartment; and (e) a removal assisting section for, in the vicinity of the apparatus connector, pushing the accommodated battery pack up in the direction opposite to the depth of the battery compartment.

According to a third aspect of the present invention, a portable electronic apparatus, that can accommodates a battery pack, comprises: (a) a battery compartment for accommodating a battery pack, the compartment being a recessed portion provided on the body of the portable electronic apparatus; (b) a latching member for latching the accommodated battery pack, the latching member being provided on a side wall of the battery compartment; and (c) a locking member for inhibiting the latching member from being released by being pushed along the depth of the battery compartment.

According to a fourth aspect of the present invention, a portable electronic apparatus, that can accommodates a battery pack, comprises: (a) a battery compartment for accommodating a battery pack, the compartment being a recessed portion provided on the body of the portable electronic apparatus; (b) a latching member for latching the accommodated battery pack, the latching member being provided on a side wall of the battery compartment; (c) a locking member for inhibiting the latching member from being released by being pushed along the depth of the battery compartment; (d) an apparatus connector for receiving a connector of the battery pack in the direction of the depth of the battery compartment; and (e) a removal assisting section, in the vicinity of the apparatus connector, for pushing the accommodated battery pack up in the direction opposite to the depth of the battery compartment.

The latching member may be constituted by a rotary shaft, which is provided on one end of the latching member and is supported at an edge of a bottom face of the battery compartment; a latch, which is provided on the other end of the latching member and is used to catch the battery pack that is accommodated in the battery compartment; an urging section, which urges the latch in a direction in which the battery pack is caught; and a receiving portion for accepting the locking member so that the locking member can be moved in the direction of the depth of the battery compartment.

A distal end of the latch of the latching member may be chamfered. The locking member may have a slide portion inserted into and slides freely within the receiving portion, and a head that is constantly exposed at the receiving portion. The locking member may inhibit rotation in a direction in which the latch is released, at an inhibit-unlocking position to which the locking member is moved when displaced in the direction of the depth of the battery compartment, and may permit the rotation in the direction in which the latch is released, at a permit-unlocking position to which the locking member is moved when displaced in a direction opposite to the direction of the depth of the battery compartment.

In the battery attaching mechanism according to the present invention, to remove the battery pack, while the head of the locking member is held, the locking member is pulled in the direction opposite to the direction of the depth of the battery compartment (i.e., in the direction of the height of the computer). Although the latch of the latching member is constantly driven in the direction in which the battery pack is locked, it can be moved in an unlocking direction, at the position to which the locking member is moved when displaced in the direction opposite to the direction of the depth. When unlocking is permitted, the head of the locking member is grasped and the locking member is moved in the direction for unlocking, so that the battery pack is also released.

A connector provided in and along the depth of the battery compartment receives the connector on the battery pack. Therefore, friction occurs in the direction opposite to the depth (i.e., along the height of the main body) at the connector area on the battery pack. The removal assisting section exerts a force to push the battery pack up. As soon as the locking state is released, the removal assisting section pushes the battery pack up to disengage the connectors. When a battery pack has been unlocked it can even be removed with one hand.

According to the battery attaching mechanism of the present invention, the battery pack is unlocked by moving the locking member in the direction of the depth of the battery compartment, i.e., the main body of the computer. Generally, pulling a component upward in the direction of the height of the computer is not performed unintentionally so that, compared with the conventional method that uses the slide knob, there is little probability that a user will release the lock without being aware of doing so.

Even when the computer is mistakenly turned upside down without setting the locking state, as the locking member projects upward in the direction of the height of the computer, its head will abut the surface of a desk when the computer is placed on the desk, so that the computer will be automatically set to the locking state.

The battery attaching mechanism of the present invention has a dual locking mechanism composed of two members, the latching member and the locking member. Since the two members are collectively located at one place, they can be operated with one hand.

Since the distal end of the latch of the latching member is chamfered, this chamfered portion will reduce the impact experienced by the battery pack, even when the battery pack is forced in while the locking state is set, and will also provide a little elasticity so that the battery pack can be inserted.

BRIEF DESCRIPTION OF THE DRAWINGS

The other objects, features, and advantages of the present invention will become apparent in due course during the detailed description of the embodiment of the present invention, which will be given while referring to the accompanying drawings wherein.

DESCRIPTION OF THE PREFERRED EMBODIMENT

Figure 1:
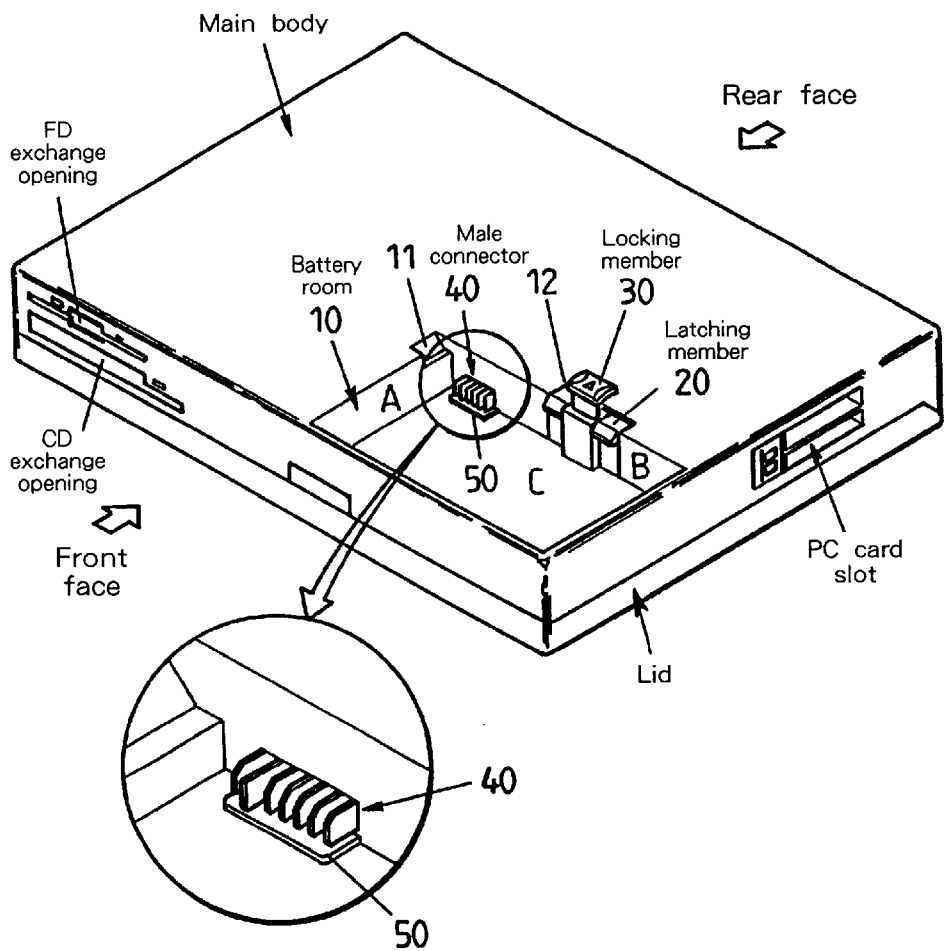
FIG. 1 is a perspective view, from the bottom, of a notebook PC according to one embodiment of the present invention.

FIG. 1 is a perspective view of the appearance of a notebook PC according to one embodiment of the present invention. The PC is viewed from the bottom, and the main body is folded over on the lid. An exchange opening for media, such as a CD (Compact Disk) or an FD (Floppy Disk), is formed at the front of the PC main body. A PC card slot is formed in the side wall for the insertion and extraction of a PC card.

A battery compartment 10 is recessed at about one corner of the bottom of the PC main body. The battery compartment 10 has a shallow bottom that is substantially the same size as a flat battery pack (which will be described later). A notch 11 is formed at the edge of a side wall A of the battery compartment 10. A user slips a finger into the notch portion 11 when he or she removes a battery pack.

A slit-shaped male connector 40 for making an electric connection with a battery pack (which will be described later) is provided at one corner of the bottom C of the battery compartment 10. The male connector 40 is constituted by two or more terminals extending in the direction of the depth of the battery compartment 10 (see the enlarged diagram in FIG. 1). A female connector (which will be described later) of the battery pack can be accessed in the direction of the depth of the battery compartment 10 (i.e., in the direction of the height of the PC main body) relative to the male connector 40.

A pop-up plate 50 is located under the male connector 40. A force exerted in the direction opposite to the depth of the battery compartment 10 is applied to the pop-up plate 50 by a leaf spring (not shown in FIG. 1) that is attached to the reverse side. The pop-up plate 50 therefore acts to drive an unlocked battery pack in the discharge direction (a detailed explanation will be given later).

A recessed portion 12 is formed in a side wall B (upper left to lower right shaded portion in FIG. 4) of the battery compartment 10, for the attachment of a latching member 20 and a locking member 30. The latching member 20 holds the battery pack that is accommodated, and the locking member 30 inhibits the release of the locked state provided by the latching member 20. With the cooperative actions of the two members 20 and 30, the battery pack can be securely fixed and can be easily removed by performing a simple operation. A detailed explanation will be given later.

The PC main body incorporates a system board, on which are mounted a CPU, various controller chips and memory, and external storage devices, such as an HDD, an FDD and a CD-ROM drive (none of them shown). These components are not directly related to the subject of the present invention, and no illustrations for them or explanations will be given.

Figure 2:
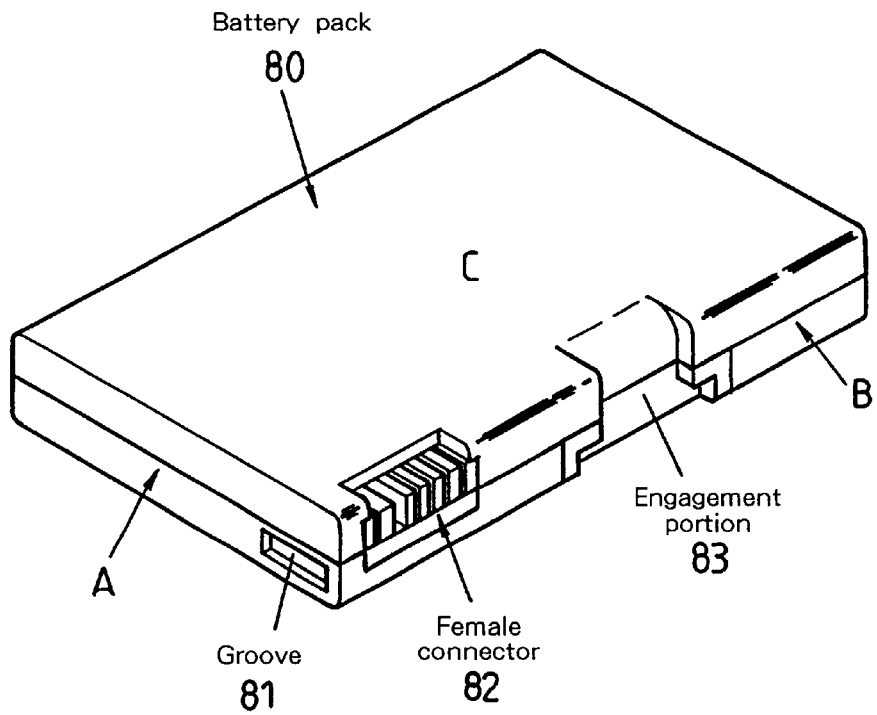
FIG. 2 is a diagram showing the appearance of a battery pack 80 that can be accepted in a battery compartment 10.

FIG. 2 is a perspective view of the appearance of a battery pack 80 that can be retained in the battery compartment 10. When the battery pack 80 is accommodated, the side walls A and B and the upper face C of the battery pack 80 face the side walls A and B and the bottom face C of the battery compartment 10, respectively.

A groove 81 is formed in the side wall A of the battery pack 80. The notch 11, which is formed in the corresponding portion at the side edge of the battery compartment 10 (see FIG. 1), permits a user to insert a finger and hold the groove 81.

A female connector 82 is formed at one end of the wall B of the battery pack 80. The female connector 82 has two or more slits that are opened in the direction of the height of the battery pack 80. U-shaped terminals that serve as electric contact points are located on the internal walls of the respective slits. The terminals are assigned for the positive poles, negative poles, and the purposes of detection of a voltage and temperature. Since the electric and mechanical specifications for the female connector 82 match those for the terminals of the male connector 40 in the battery compartment 10, these male terminals can engage the female terminals.

An engagement portion 83 is recessed substantially in the center of the wall B of the battery pack 80. The engagement portion 83 is a substantially T-shaped groove. When the latch portion (which will be described later) of the latching member 20 engages with a bar portion of the T-shape groove, movement of the battery pack 80 is halted (which will be described later).

Figure 3:
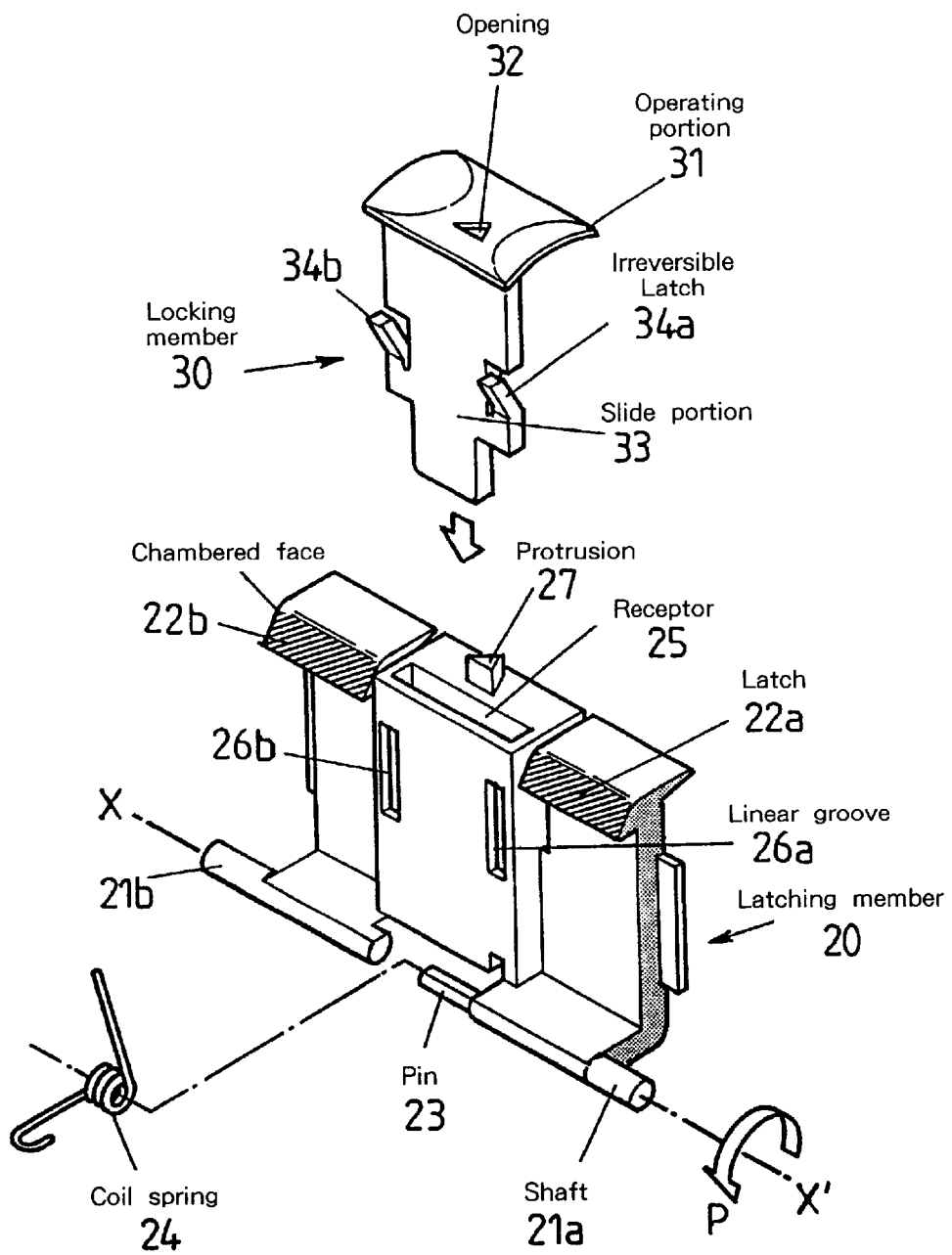
FIG. 3 is a detailed diagram illustrating the structures of a latching member 20 and a locking member 30.

FIG. 3 is a detailed diagram illustrating the structures of the latching member 20 and the locking member 30. The latching member 20 is a molded product having a substantial U-shape in cross section. A pair of shafts 21a and 21b project from the distal ends of the short legs of an L-shaped structure, and are supported by bearings (not shown) in the battery compartment 10 so that they rotate around rotation axis X—X. A pin 23 projects into the gap between the shafts 21a and 21b along the axis X—X. A coil spring 24 is fitted over the pin 23 and is attached to the battery compartment 10, so that a rotational force acts on the latching member 20 in the direction indicated by arrow P.

A pair of latches 22a and 22b are formed at the distal end of the long leg of the L-shaped structure. The long leg of the L-shaped structure is pushed down in the battery compartment 10 by the recovery force exerted by the coil spring 24, and the latches 22a and 22b engage the engagement portion 83 of the battery pack 80, thereby holding the battery back 80 in the battery compartment 10. The edges of the latches 22a and 22b are chamfered (shaded portions in FIG. 3).

A receptor 25, that has an elongated hole extending longitudinally, is formed substantially in the center of the long leg of the L-shaped structure. The locking member 30 is inserted into, or removed from, the receptor 25. A pair of linear grooves 26a and 26b are formed in the side wall of the receptor 25 and extend longitudinally, i.e., in the direction in which the locking member 30 is moved. A protrusion 27 having a triangular shape is formed near the hole of the receptor 25.

The locking member 30, a molded product that is L-shaped in cross section, has a long leg portion that constitutes a slide portion 33, and a short leg portion that serves as an operating portion 31. The long leg portion, i.e., the slide portion 33, is inserted into the receptor 25, and the L-shaped locking member 30 is held in the upside-down position.

A pair of irreversible latches 34a and 34b are formed in the slide portion 33. The positions and the sizes of the irreversible latches 34a and 34b correspond to the linear grooves 26a and 26b in the latching member 20. Once the slide portion 33 is inserted into the receptor 25, the irreversible latches 34a and 34b fit into the linear grooves 26a and 26b and can not be extracted any more. Although the slide portion 33 can be moved longitudinally, the distance it can be moved is limited to the range within which the irreversible latches 34a and 34b can be shifted along the linear grooves 26 and 26b.

The operating portion 31 is grasped by a user to move the locking member 30. Both sides of the operating portion 31 are curved so that user's finger nails can be used to catch hold of them. The operation of the locking member 30 involves the insertion/removal of the locking member 30, or the shifting of the locking member 30, which engages the latching member 20, in the direction opposite to the direction indicated by the arrow P.

An opening 32 having a triangular shape is formed in the operating section 31. The opening 32 has the same size of the protrusion 27 on the latching member 20, and is so located that it accepts the protrusion 27 when the locking member 30 is fitted completely inside the receptor 25. By fitting the protrusion 27 into the opening 32, the locking member 30 and the latching member 20 can be more securely engaged. The direction indicated by the tip of the triangular shape opening 32 suggests the direction in which the lock is released.

Figure 4:
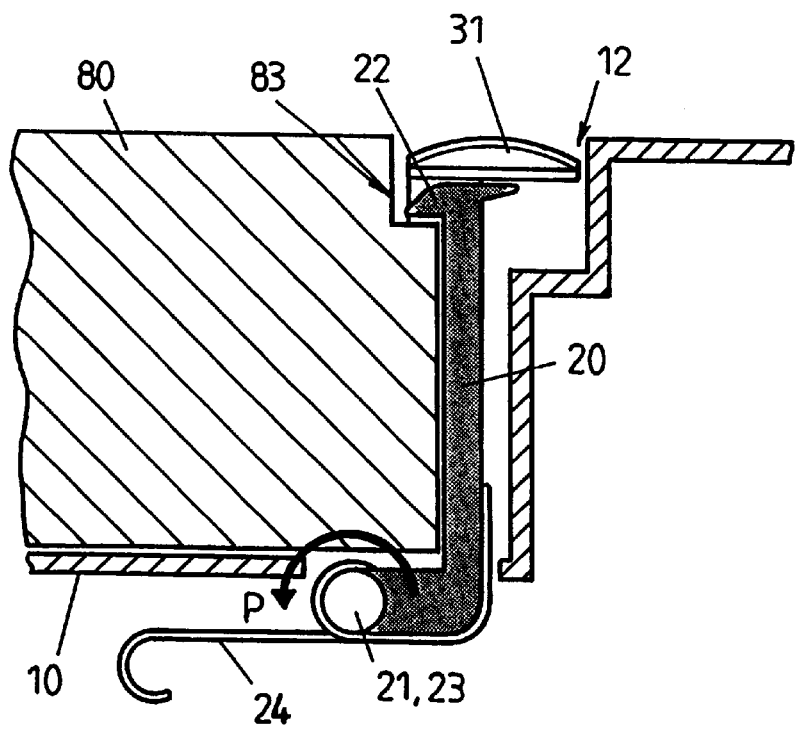
FIG. 4 is a cross-sectional view of the locking condition where the battery pack 80 is accommodated in the battery compartment 10.

FIG. 4 is a cross sectional view of the periphery of the latching member 20 when the battery pack 80 is accommodated in the battery compartment 10. As is shown in FIG. 4, the locking member 30 fits completely inside the receptor 25, and only the operating portion 31 is exposed.

The rotational force in the direction indicated by the arrow P is provided for the latching member 20 by the coil spring 24, and the latches 22a and 22b securely engage the engagement portion 83, which is formed in the side wall of the battery pack 80, thus preventing the battery pack 80 from falling.

To disengage the latches 22a and 22b from the engagement portion 83, the latching member 20 must be rotated in the direction opposite the direction indicated by the arrow P. However, in this condition, the operating portion 31 abuts the edge of the recessed portion 12 and inhibits movement in the direction opposite to the direction indicated by the arrow P.

Figure 5:
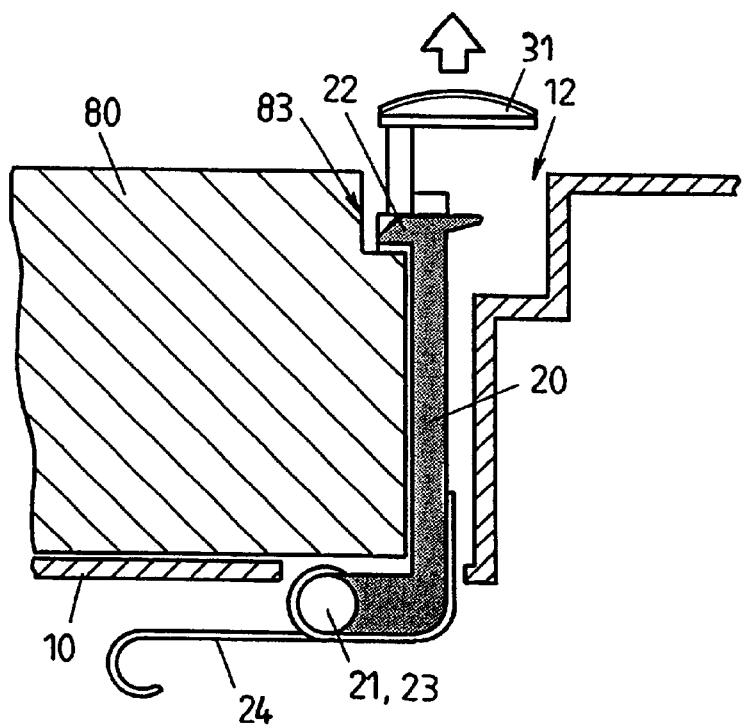
FIG. 5 is a cross-sectional view of the condition where the locking state of the battery pack 80 has been released.

FIG. 5 is a diagram showing the condition where the locking state of the battery pack 80 has been released. As is shown in FIG. 5, when a user grasps the operating portion 31 and pulls it up, the operating portion 31 is lifted within the range permitted by the movement of the irreversible latches 34a and 34b inside the linear grooves 26a and 26b. As a result, the operating portion 31 is moved away from the edge of the recessed portion 12, and thus permits rotation of the latching member 20 in the direction opposite the direction indicated by the arrow P.

Figure 6:
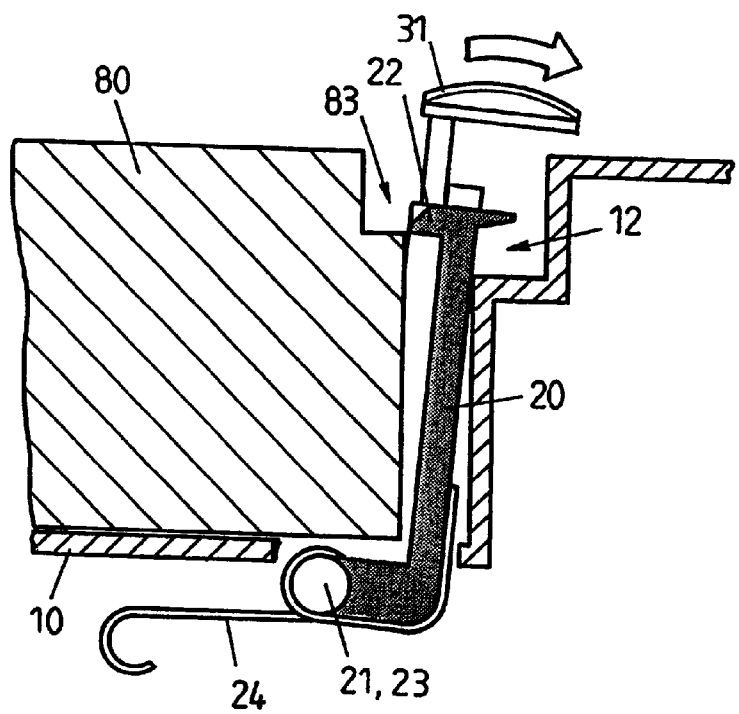
FIG. 6 is a cross-sectional view of the condition where the battery pack 80 has been disengaged.

As is shown in FIG. 6, when the assembly composed of the locking member 30 and the latching member 20 is pushed down in the direction opposite the direction indicted by the arrow P while the operating portion 31 is held, the latches 22a and 22b are retracted from the engagement portion 83 of the battery pack 80, and the locking state is thereby released.

Figure 7:
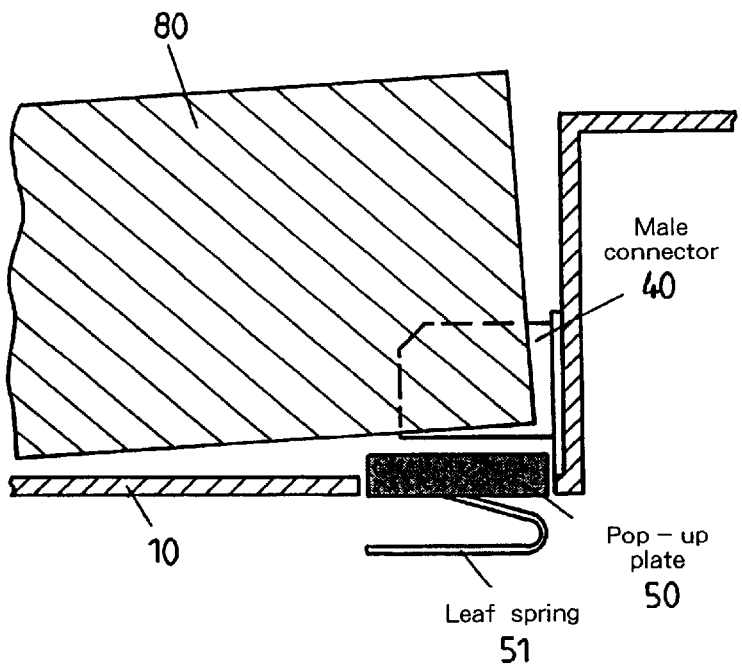
FIG. 7 is a diagram illustrating the periphery of a male connector 40 in the battery compartment 10.

FIG. 7 is a cross-sectional view of the periphery of the male connector 40 of the battery compartment 10. As previously mentioned, the male connector 40 is constituted by a plurality of terminals having a slit shape, and the terminals are to be fitted into the U-shaped terminals of the female connector 82 of the battery pack 80. Because of the face-contact connections of the terminals of the male connector 40 and of the female connector 82, friction resistance is relatively large, so that the battery pack 80 can not easily be removed with one hand merely upon the release of the locking state (see FIG. 6).

As was previously described, the pop-up plate 50 is provided under the male connector 40. The leaf spring 51 is attached to the reverse side of the pop-up plate 50, and urges the pop-up plate 50 upward. When the locking state is released, the battery pack 80 is pushed upward by the pop-up plate 50, and can then easily be removed with one hand.

Figure 8:
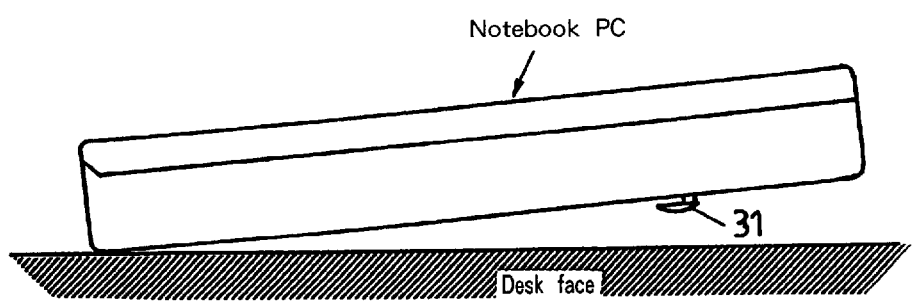
FIG. 8 is a diagram showing the condition where the notebook PC has been mistakenly turned over before being set in the locking state, i.e., while an operating portion 31 is not fully fitted into a receptor 25.

FIG. 8 is a diagram showing the condition when the notebook PC is mistakenly turned over while the locking state has not yet been set, i.e., while the operating portion 31 is not fully fitted into the receptor 25. As is shown in FIG. 8, the operating portion 31 projects outward from the bottom of the notebook PC. When the PC is placed on the desk, the operating portion 31 is automatically pushed in, resulting in the setting to the locking state shown in FIG. 4.

During the period from the time the notebook PC is turned over until it is placed on the desk, the battery pack 80 is simply in the holding state (see FIG. 5). However, this period is very short, and the strength of the engagement provided by the latches 22a and 22b, impelled by the coil spring 24, is sufficient to hold the battery pack 80.

Figure 9:
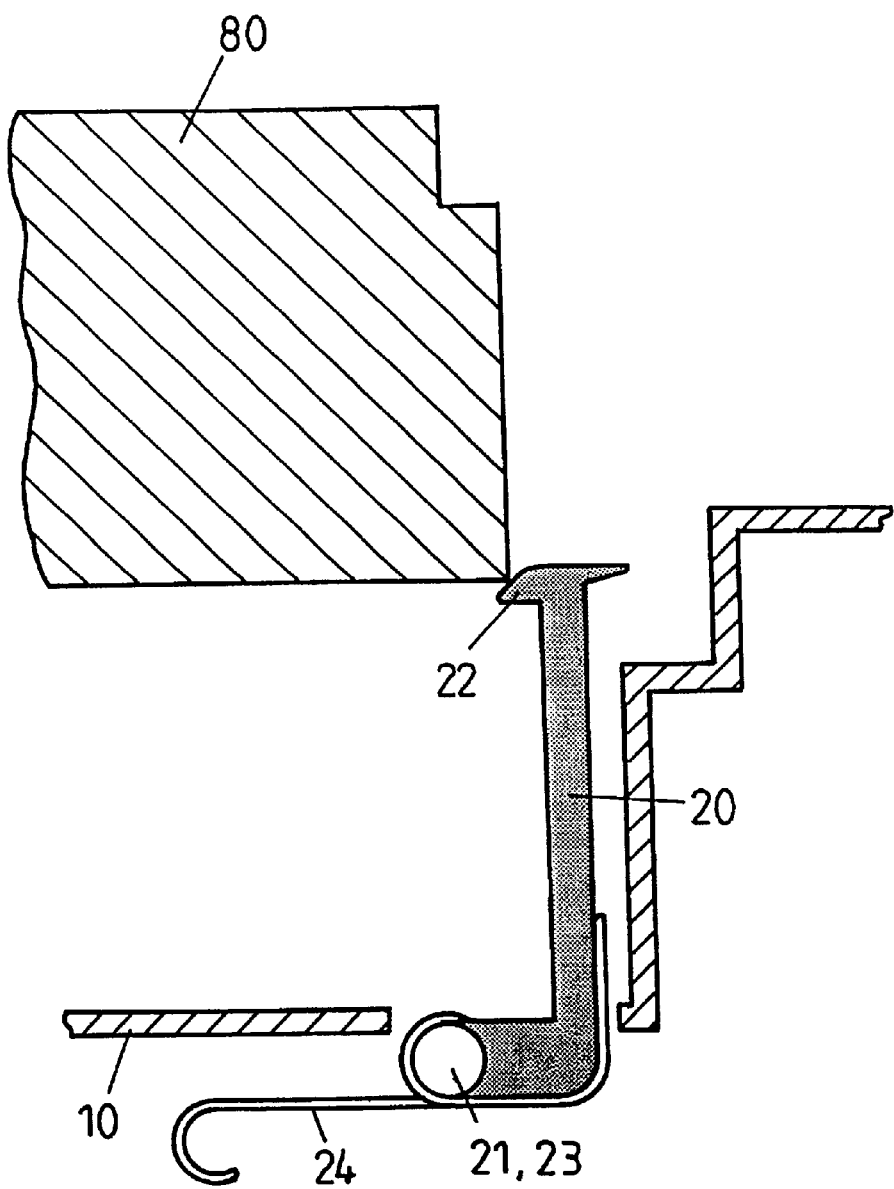
FIG. 9 is a cross-sectional view of the condition where the battery pack 80 is forcibly inserted into the battery compartment 10 in the locking state.
Figure 10:
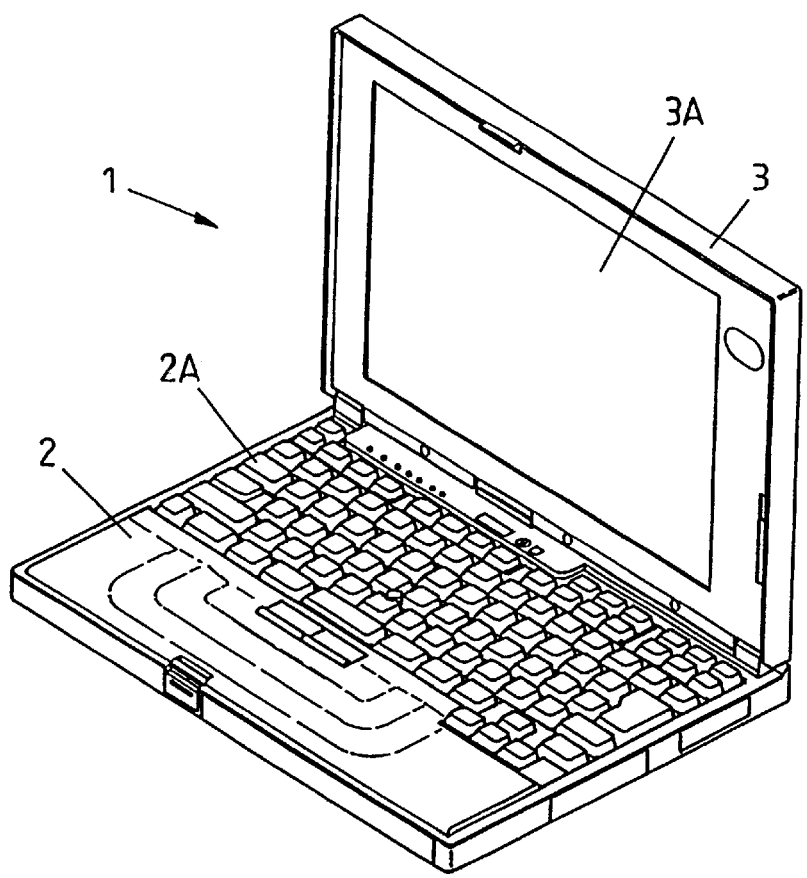
FIG. 10 is a diagram illustrating the appearance of a specific notebook PC.
Figure 11:
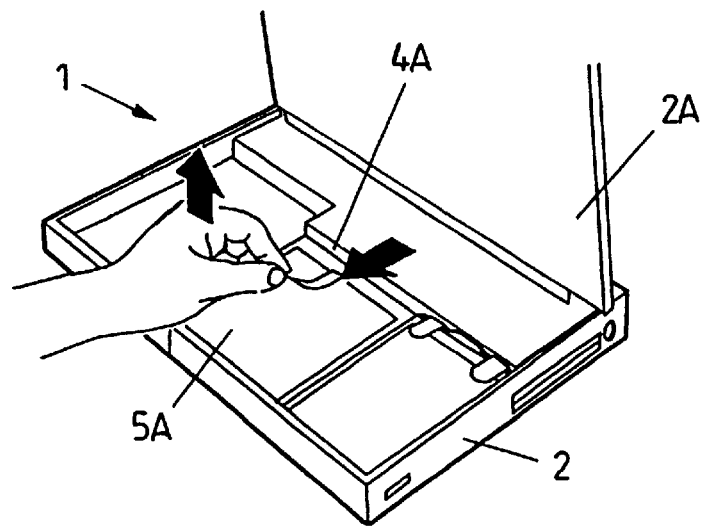
FIG. 11 is a diagram showing the conventional condition where a battery pack is inserted in a battery compartment in a notebook PC.
Figure 12:
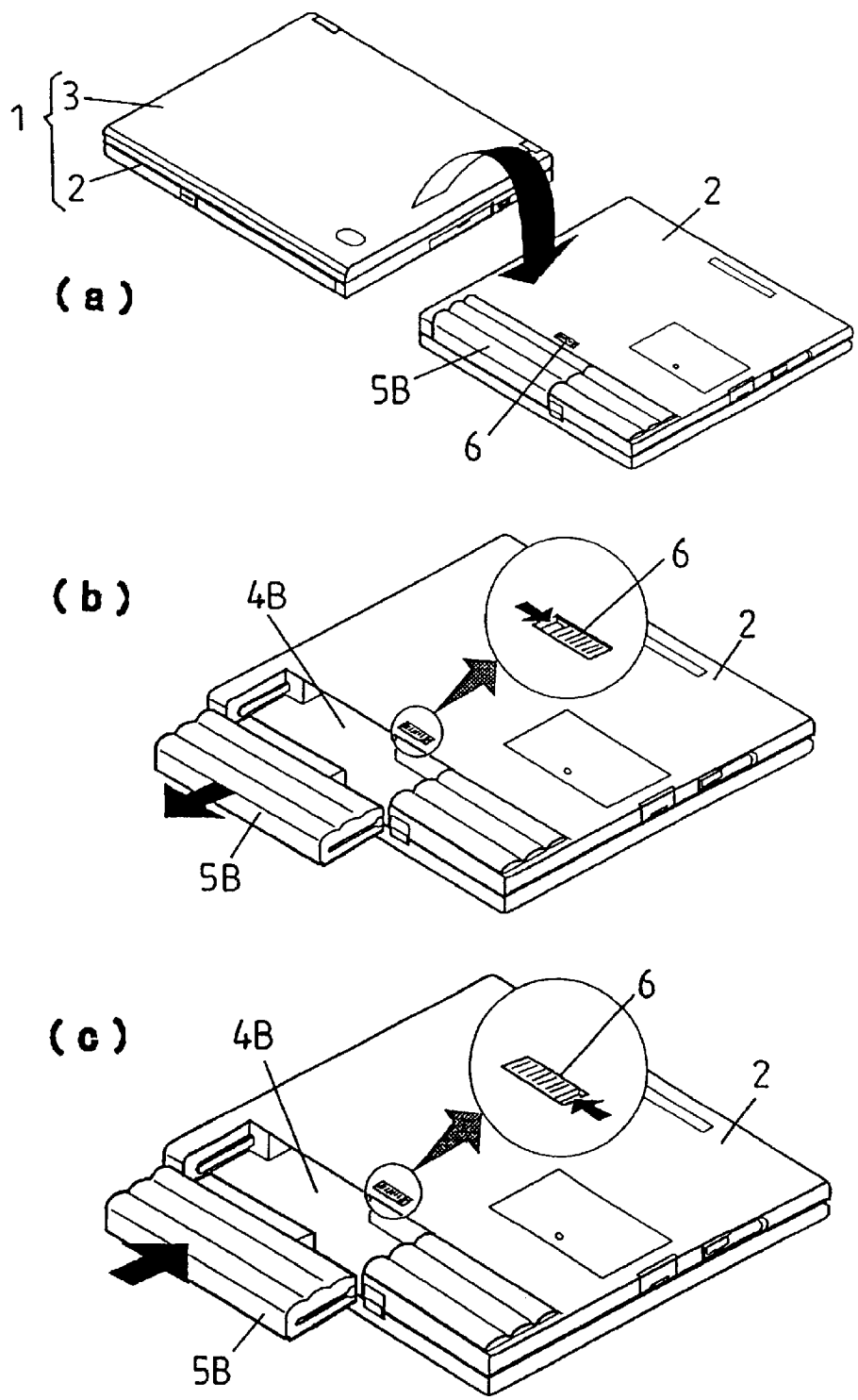
FIGS. 12a–c is a diagram illustrating a conventional process by which a battery pack is inserted into a battery compartment in a notebook PC.

FIG. 9 is a diagram showing the condition where the battery pack 80 is forcibly attached to the PC in the locking state. As is shown in FIG. 9, the edge of the bottom of the battery pack 80 abuts upon the edge of the latch 22 of the latching member 20, and the insertion of the battery pack 80 is temporarily halted.

Since the tip of the latches 22a and 22b are chamfered, the impact between the latches 22a and 22b and the battery pack edge is reduced. And also, since the long leg portions of the latching member 20 are moved back within a permissible recovery range, the edge of the bottom of the battery pack 80 slides down along the chamfered faces. As a result, the battery pack 80 is accepted in the battery compartment 10.

The present invention has been described in detail while referring to a specific embodiment. However, it should be obvious to one having ordinary skill in the art that various modifications or revisions of the embodiment are possible within the scope of the present invention. For example, the present invention can be applied to battery operated electric/electronic devices, such as portable radio terminals, cordless telephones, electronic notebooks, video cameras, or other cordless devices. That is, although the present invention has been disclosed by using an example, it should not be limited to that example. To fully understand the subject of the present invention, the claims should be referred to.

As is described above, according to the present invention, provided is a superior battery attaching mechanism, for portable computers, in which a battery compartment is recessed in the face of a wall of a computer.

Further, according to the present invention, provided is a battery attaching mechanism for portable computers with which a battery can be safely stored and secured, and yet can be easily removed by performing a simple operation.

In addition, according to the present invention, provided is a battery attaching mechanism, for portable computers, with which, even when a battery holding state or a battery locked state exists in the computer, a battery pack can be inserted without causing damage to a holding mechanism and a locking mechanism.

What is claimed is:

1. A battery attaching mechanism, for a portable electronic apparatus into which a battery pack can be accommodated, comprising:
   (a) a battery compartment for accommodating a battery pack, said compartment being a recessed portion provided on the body of said portable electronic apparatus;
   (b) a latching member for latching the accommodated battery pack, said latching member being provided on a side wall of said battery compartment and having an outer latching member surface;
   (c) a locking member for inhibiting said latching member from being released by contact with said outer latching member surface of said latching member;
   (d) a connector for receiving a connector of said battery pack; and
   (e) a removal assisting section for, in the vicinity of said connector, pushing said accommodated battery pack away from said connector.

2. The battery attaching mechanism for a portable electronic apparatus according to claim 1, wherein said latching member is constituted by a rotary shaft, which is provided on a first end of said latching member and is supported at an edge of a bottom face of said battery compartment; a latch, which is provided on a second end of said latching member and is used to catch said battery pack that is accommodated in said battery compartment; an urging section, which urges said latch in a first direction in which said battery pack is caught; and a receiving portion for accepting said locking member so that said locking member can be moved in a second direction and a third direction along a plane from said first to said second ends of said latching member, wherein said second direction is from said first to said second end and said third direction is from said second to said first end.

3. The battery attaching mechanism for a portable electronic apparatus according to claim 1, wherein said outer latching member surface of said latch of said latching member is chamfered.

4. The battery attaching mechanism for a portable electronic apparatus according to claim 1, wherein said locking member has a slide portion inserted into and slides freely able to slide freely in said second and third directions within said receiving portion, and a head that is constantly exposed at said receiving portion, and wherein said locking member inhibits rotation of said shaft in a fourth direction in which said latch is released, said fourth direction being opposite to said first direction, at an unlocking inhibit position to which said locking member is moved when displaced in said third direction, and permits said rotation in said fourth direction in which said latch is released, at an unlocking permit position to which said locking member is moved when displaced in said second direction.

5. The battery attaching mechanism for a portable electronic apparatus according to claim 1, wherein said latching member is constituted by a rotary shaft, which is provided on a first end of said latching member and is supported at an edge of a bottom face of said battery compartment; a latch, which is provided on a second end of said latching member and is used to catch said battery pack that is accommodated in said battery compartment, said latch comprising said outer latching member surface; an urging section, which urges said latch in a first direction in which said battery pack is caught; and a receiving portion for accepting said locking member so that said locking member can be moved in a second direction and a third direction along a plane from said first to said second ends of said latching member, wherein said second direction is from said first to said second end and said third direction is from said second to said first end.

6. The battery attaching mechanism for a portable electronic apparatus according to claim 5, wherein said outer latching member surface of said latch of said latching member is chamfered.

7. The battery attaching mechanism for a portable electronic apparatus according to claim 5, wherein said locking member has a slide portion inserted into and able to slide freely in said second and third directions within said receiving portion, and a head that is constantly exposed at said receiving portion, and wherein said locking member inhibits rotation of said shaft in a fourth direction in which said latch is released, said fourth direction being opposite to said first direction, at an unlocking inhibit position to which said locking member is moved when displaced in said third direction, and permits said rotation in said fourth direction in which said latch is released, at an unlocking permit position to which said locking member is moved when displaced in said second direction.

8. A portable electronic apparatus, that can accommodates a battery pack, comprising:
   (a) a battery compartment for accommodating a battery pack, said compartment being a recessed portion provided on the body of said portable electronic apparatus;
   (b) a latching member for latching the accommodated battery pack, said latching member being provided on a side wall of said battery compartment and having an outer latching member surface;
   (c) a locking member for inhibiting said latching member from being released by contact with said outer latching member surface of said latching member being pushed along the depth of said battery compartment;
   (d) a connector for receiving a connector of said battery pack; and
   (e) a removal assisting section for, in the vicinity of said connector, pushing said accommodated battery pack away from said connector.

9. The portable electronic apparatus according to claim 8, wherein said latching member is constituted by a rotary shaft, which is provided on a first end of said latching member and is supported at an edge of a bottom face of said battery compartment; a latch, which is provided on a second end of said latching member and is used to catch said battery pack that is accommodated in said battery compartment; an urging section, which urges said latch in a first direction in which said battery pack is caught; and a receiving portion for accepting said locking member so that said locking member can be moved in a second direction and a third direction along a plane from said first to said second ends of said latching member, wherein said second direction is from said first to said second end and said third direction is from said second to said first end.

10. The portable electronic apparatus according to claim 9, wherein said outer latching member surface of said latch of said latching member is chamfered.

11. The portable electronic apparatus according to claim 9, wherein said locking member has a slide portion inserted into and slides freely able to slide freely in said second and third directions within said receiving portion, and a head that is constantly exposed at said receiving portion, and wherein said locking member inhibits rotation of said shaft in a fourth direction in which said latch is released, said fourth direction being opposite to said first direction, at an unlocking inhibit position to which said locking member is moved when displaced in said third direction, and permits said rotation in said fourth direction in which said latch is released, at an unlocking permit position to which said locking member is moved when displaced in said second direction.

12. The portable electronic apparatus according to claim 8, wherein said latching member is constituted by a rotary shaft, which is provided on a first end of said latching member and is supported at an edge of a bottom face of said battery compartment; a latch, which is provided on a second end of said latching member and is used to catch said battery pack that is accommodated in said battery compartment, said latch comprising said outer latching member surface; an urging section, which urges said latch in a first direction in which said battery pack is caught; and a receiving portion for accepting said locking member so that said locking member can be moved in a second direction and a third direction along a plane from said first to said second ends of said latching member, wherein said second direction is from said first to said second end and said third direction is from said second to said first end.

13. The portable electronic apparatus according to claim 12, wherein said outer latching member surface of said latch of said latching member is chamfered.

14. The portable electronic apparatus according to claim 12, wherein said locking member has a slide portion inserted into and able to slide freely in said second and third directions within said receiving portion, and a head that is constantly exposed at said receiving portion, and wherein said locking member inhibits rotation of said shaft in a fourth direction in which said latch is released, said fourth direction being opposite to said first direction, at an unlocking inhibit position to which said locking member is moved when displaced in said third direction, and permits said rotation in said fourth direction in which said latch is released, at an unlocking permit position to which said locking member is moved when displaced in said second direction.

* * * * *